April 21, 1964 W. E. HOSKINS 3,129,853
GRANULAR MATERIAL DISPENSING DEVICE
Filed June 16, 1961
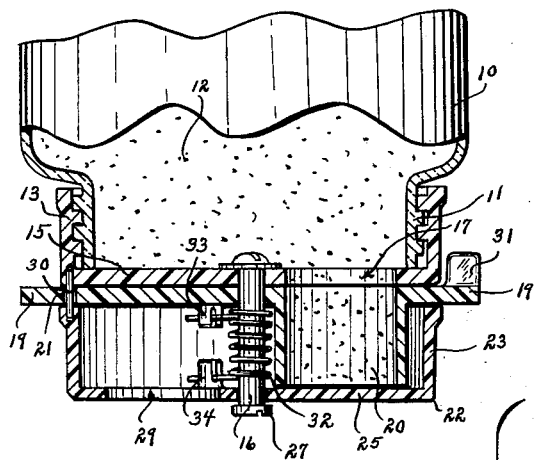
Fig. 1
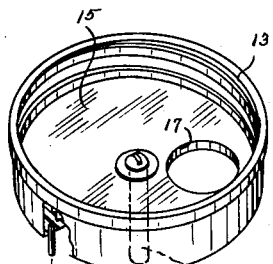
Fig. 2
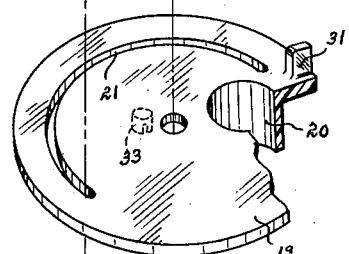
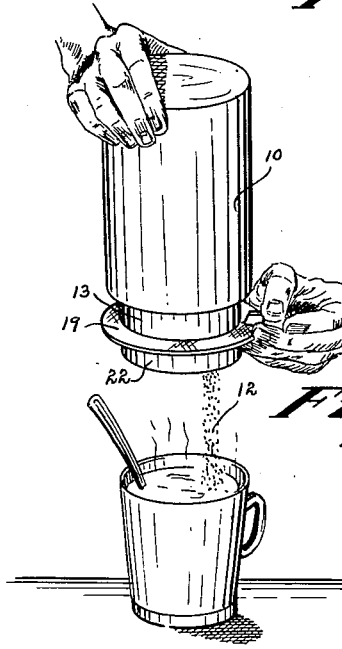
Fig. 3
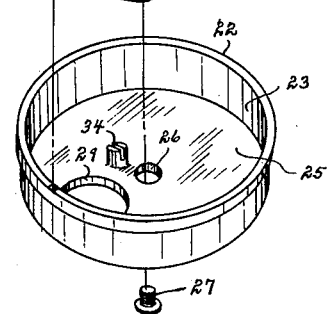
INVENTOR
WALTER E. HOSKINS
BY Talbert Dick & Farley
ATTORNEYS
WITNESS
NORMAN G. TRAVISS

United States Patent Office 3,129,853
Patented Apr. 21, 1964

3,129,853
GRANULAR MATERIAL DISPENSING DEVICE
Walter E. Hoskins, 3313 Marylynn Drive,
Des Moines, Iowa
Filed June 16, 1961, Ser. No. 117,678
3 Claims. (Cl. 222—339)

This invention relates to granular material dispensing devices and more particularly to one that will furnish measured amounts of the material each time it is actuated.

Dispensing apparatuses are old. However most heretofore devices are complicated and expensive. They are not accurate nor consistent in the unit volumes being dispensed. Another objection is that they are not readily attachable to the container holding the material to be ejected. Still another objection is that they are not self cocking for the next operation.

Therefore, one of the principal objects of my invention is to provide a granular material dispensing device that will give accurate measured amounts of the material to be dispensed each time the device is manually actuated.

A further object of this invention is to provide a dispensing device that may be easily and quickly attached to or removed from the container holding the dispensable material.

A still further object of this invention is to provide a dispenser that is automatically self-cocking after each time it is actuated to dispense a measured amount of material.

Still further objects of my invention are to provide a granular material dispensing device that is economical in manufacture, durable in use, and refined in appearance.

There and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawing, in which:

FIG. 1 is a vertical sectional view of my dispensing device,

FIG. 2 is an exploded view of the various parts that make up my device, and

FIG. 3 illustrates one way my device may be used to dispense measured amounts of material.

I have used the numeral 10 to designate a container having an externally threaded neck portion 11. The container 10 is adapted to hold the material to be dispensed such as ground coffee, flour, sugar or like 12. Such materials are often purchased in these containers and which have a screw cap lid threaded onto the neck portion 11. To use my device, the screw cap (not shown) that comes with the container is removed and my device threaded onto the container, and the container inverted as shown in the drawings.

I will now describe my dispensing device in detail. The numeral 13 designates an inverted cap lid detachably threaded onto the neck 11 of the container. This cap lid has a bottom 15 and a downwardly extending post 16 at its bottom center. At one side of the post 16, and through the bottom 15 of the cap lid 13 is a vertical hole 17. Directly below the bottom 15 is a circular plate 19 having a diameter greater than that of the diameter of the cap lid 13. This plate 19 rotatably embraces the post 16, and has a vertical cylindrical collar 20 extending downwardly and which communicates with the top surface of the plate as shown in FIG. 2. This collar hole 20 is also at one side of the post 16, and when the plate is rotated to a given position it will register and communicate with the hole 17 as shown in FIG. 1. The numeral 21 designates an arcuate slot through the plate. The numeral 22 designates an end cap having an upwardly extending circular wall 23 and a flat bottom 25. This end cap has a central hole 26 in its bottom center embracing the lower end of the post 16. It is held in place on the post 16 by a cap screw 27 threaded into the lower end of the post. At one side of the post 16 and extending through the bottom 25 is an exit hole 29. The holes 17, pipe opening 20, and hole 29 are of the same diameter. Although the plate 19 is rotatable relative to the top cap 13 and the bottom cap 22, the two caps 13 and 22 are secured together and do not have independent rotation. This is accomplished by pin 30, extending through the circular slot 21, and having one end rigidly connected to the cap 13 and its lower end rigidly connected to the lower end cap 22 as shown in FIG. 1. Although FIG. 1 illustrates only one pin 30 extending through circular slot 21, more than one pin 30 may be utilized if so desired. The end cap 22 and the upper cap 13 are of the same general diameter, and with the rotatable plate 19 between the cap 13 and the cap 22, the cylindrical pipe opening 20 will extend downwardly in to the end cap 22. The length of the cylindrical opening 20 and the height of the wall 23 of the end cap 22 is such that the bottom edge of the cylindrical pipe opening will slidably engage the upper surface of the inside of the bottom 25 of the cap 22. The numeral 31 designates a handle, knob or like on the plate 19 to affect its manually rotation. If the plate is rotated to a position shown in FIG. 1, the material 12 will flow downwardly through the hole 17 and completely fill up the open pipe cylinder 20. If the plate is then rotated a one-half revolution, the open pipe cylinder 20 will pass to a position over the end cap hole 29, and the measured material will fall through the hole 29. Inasmuch as the open pipe cylinder 20 is open at both ends, its lower end will be closed at all times except when in alignment with the hole 29 and its upper end will be closed at all times except when in alignment with the hole 17. The holes 17 and 29 should be positioned diametrically opposite of each other and the circular slot 21 and pin 30 should be so positioned that the plate 19 will have only a possible one-half rotation with the pipe cylinder 20 in communication with the hole 17 in one direction of its maximum movement and in communication with the hole 29 in the other direction of its maximum movement. By this arrangement of parts the pipe cylinder hole 20 will either be aligned with and in communication with the hole 17, or be aligned with and in communication with the hole 29.

Obviously there should be a resilient means for always normally holding the pipe cylinder 20 in communication with the hole 17. I accomplish this by a coil spring 32 embracing the post 16, having one end engaging a lug 33 on the underside of the plate 19 and its other end engaging a lug 34 on the inside bottom 25 of the end cap 22.

The container may have a stand, or be secured to a wall, or held in the hand as shown in FIG. 3. To obtain a measured amount of material 12, it is merely necessary to grasp the handle 31, and rotate the plate 19 against the yielding action of the spring 32. Upon release of the handle 31, the spring 32 will automatically return the plate 19 to a position where the pipe cylinder 20 will be under the hole 17, and will immediately fill up with another measured amount of material to be dispensed. If desired the parts 13, 19, and 22 may be of transparent plastic.

Some changes may be made in the construction and arrangement of my granular material dispensing device without departing from the real spirit and purpose of my invention, and it is my intention to cover by my claims, any modified forms of structure or use of mechanical equivalents which may be reasonably included within their scope.

I claim:
1. A dispenser for granular material and the like comprising in combination:
   a container closed at the top and having an opening at the bottom thereof defined by an externally threaded neck portion;
   an upper cap having an internally threaded circular wall threadably engaged with said neck portion, and having further a cover wall extended over said opening, said cover wall having a circular first opening formed therein and offset from the center of said cover wall;
   an elongated center post secured at its upper end to said cover wall at the center thereof and extended normally downwardly therefrom on the longitudinal axis of said container;
   a substantially circular plate rotatably mounted at its center to said center post and mounted contiguous to said cover wall, said plate having an arcuate slot formed therein concentrically with said center post, and having also formed therein an opening separate from said slot and of a size similar to said first opening, said plate having further a tubular collar integral therewith and in registration with said plate opening;
   a lower cap having a circular wall having a diameter similar to that of said upper cap wall and adapted for placement contiguous to said plate, said lower cap having a bottom wall through the center of which said center post extends, said bottom wall having a second opening formed therein radially offset from said cover wall first opening, the upper surface of said bottom wall contiguous with the lower edge of said collar;
   means extended through said arcuate slot for connecting said upper cap and said lower cap together and whereby said plate is rotatable relative thereto, said means providing a limit for rotation of said plate upon engagement of said means by said plate at either end of said arcuate slot; and
   spring means connected between said plate and said lower cap for biasing said plate toward a first position wherein said plate opening and collar register with said first opening, said plate being rotatable against the bias of said spring means to a second position wherein said plate opening and collar register with said second opening.

2. A dispenser for granular material and the like comprising in combination:
   a container closed at the top and having an opening at the bottom thereof defined by an externally threaded neck portion;
   an upper cap having an internally threaded circular wall threadably engaged with said neck portion, and having further a cover wall extended over said opening, said cover wall having a circular first opening formed therein and offset from the center of said cover wall;
   an elongated center post secured at its upper end to said cover wall at the center thereof and extended normally downwardly therefrom on the longitudinal axis of said container;
   a substantially circular plate rotatably mounted at its center to said center post and mounted contiguous to said cover wall, said plate having an arcuate slot formed therein concentrically with said center post, and having also formed therein an opening separate from said slot and of a size similar to said first opening, said plate having further a tubular collar integral therewith and in registration with said plate opening;
   a lower cap having a circular wall having a diameter similar to that of said upper cap wall and adapted for placement contiguous to said plate, said cap having a bottom wall through the center of which said center post extends, said bottom wall having a second opening formed therein radially offset from said cover wall first opening, the upper surface of said bottom wall contiguous with the lower edge of said collar;
   at least one pin securely connecting said upper cap and said lower cap together and with said plate rotatable relative thereto, said pin extending through said arcuate slot and adapted to limit rotative movement of said plate upon engagement with either end of said arcuate slot; and
   spring means connected between said plate and said lower cap for biasing said plate toward a first position wherein said plate opening and collar register with said first opening, said plate being rotatable against the bias of said spring means to a second position wherein said plate opening and collar register with said second opening.

3. A dispenser for granular material and the like comprising in combination:
   a container closed at the top and having an opening at the bottom thereof defined by an externally threaded neck portion;
   an upper cap having an internally threaded circular wall threadably engaged with said neck portion, and having further a cover wall extended over said opening, said cover wall having a circular first opening formed therein and offset from the center of said cover wall;
   an elongated center post secured at its upper end to said cover wall at the center thereof and extended normally downwardly therefrom on the longitudinal axis of said container;
   a substantially circular plate rotatably mounted at its center to said center post and mounted contiguous to said cover wall, said plate having an arcuate slot formed therein concentrically with said center post, and having also formed therein an opening separate from said slot and of a size similar to said first opening, said plate having further a tubular collar integral therewith and in registration with said plate opening;
   a lower cap having a circular wall having a diameter similar to that of said upper cap wall and adapted for placement contiguous to said plate, said cap having a bottom wall through the center of which said center post extends, said bottom wall having a second opening formed therein radially offset from said cover wall first opening, the upper surface of said bottom wall contiguous with the lower edge of said collar;
   at least one pin securely connecting said upper cap and said lower cap together and with said plate rotatable relative thereto, said pin extending through said arcuate slot and adapted to limit rotative movement of said plate upon engagement with either end of said arcuate slot; and
   a coil spring surroundingly embracing said center post and with one end connected to said plate and the other end connected to said lower cap for biasing said plate toward a first position wherein said plate opening and collar register with said first opening, said plate being rotatable against the bias of said spring to a second position wherein said plate opening and collar register with said second opening.

References Cited in the file of this patent

UNITED STATES PATENTS

| | | |
|---|---|---|
| 1,656,980 | Kronke | Jan. 24, 1928 |
| 2,204,821 | Priddy | June 18, 1940 |
| 2,385,677 | Bailey | Sept. 25, 1945 |
| 2,584,781 | Beatty | Feb. 5, 1952 |
| 2,894,662 | Mansperger | July 14, 1959 |
| 2,898,010 | Tepper | Aug. 4, 1959 |
| 2,901,150 | Matter | Aug. 25, 1959 |
| 2,904,230 | Worth | Sept. 15, 1959 |